United States Patent [19]

Caines

[11] Patent Number: 4,515,863
[45] Date of Patent: May 7, 1985

[54] POLYESTER FILM PRIMED WITH PHOSPHORUS-CONTAINING POLYESTER

[75] Inventor: R. Scott Caines, Greer, S.C.

[73] Assignee: American Hoechst Corporation, Somerville, N.J.

[21] Appl. No.: 590,399

[22] Filed: Mar. 16, 1984

[51] Int. Cl.$^3$ .................. B32B 27/06; B32B 27/36
[52] U.S. Cl. ................................. 428/480; 528/287
[58] Field of Search .................... 528/287; 428/480

[56] References Cited

U.S. PATENT DOCUMENTS

| 2,627,088 | 2/1953 | Alles et al. | 264/134 |
| 2,698,240 | 12/1954 | Alles et al. | 430/535 |
| 4,073,993 | 2/1978 | Lark | 428/480 |
| 4,098,741 | 7/1978 | Login | 428/378 |
| 4,214,035 | 7/1980 | Heberger | 428/340 |
| 4,215,035 | 7/1980 | Memering et al. | 524/417 |
| 4,252,885 | 2/1981 | McGrail et al. | 430/160 |
| 4,259,222 | 3/1981 | Login et al. | 528/287 |
| 4,304,851 | 12/1981 | McGrail et al. | 430/533 |
| 4,373,002 | 2/1983 | Petersen | 428/480 |
| 4,394,442 | 7/1983 | Miller | 428/480 |
| 4,439,479 | 3/1984 | Kanai et al. | 428/480 |

FOREIGN PATENT DOCUMENTS

| 0029620 | 6/1981 | European Pat. Off. | |
| 54-13584 | 2/1979 | Japan | 428/480 |
| 55-5851 | 1/1980 | Japan | 428/480 |
| 58-1727 | 1/1983 | Japan | 428/480 |
| 1201639 | 8/1970 | United Kingdom | 428/480 |
| 1249015 | 10/1971 | United Kingdom | |
| 1371855 | 10/1974 | United Kingdom | |
| 1411564 | 10/1975 | United Kingdom | |
| 1465496 | 2/1977 | United Kingdom | |
| 1572345 | 7/1980 | United Kingdom | |

Primary Examiner—Ronald W. Griffin
Attorney, Agent, or Firm—James R. Cartiglia

[57] ABSTRACT

A primer coated oriented polyester film is disclosed wherein the primer coating comprises a polyester comprising a branched chain phosphorus-containing polymer which is the reaction product of at least one dicarboxylic reactant, at least one diol or polyoxyalkylene glycol and a phosphorus acid reactant. Preferred species include isophthalic acid as the dicarboxylic reactant, diethylene glycol as the diol or polyoxyalkylene glycol and phosphoric acid as the phosphorus acid reactant. The polyester primer coating may be applied to the polyester film before or during the stretching operations. The resultant primed polyester film is found to provide excellent adhesion to many aqueous or organic solvent based printing inks subsequently applied thereto.

22 Claims, No Drawings

POLYESTER FILM PRIMED WITH PHOSPHORUS-CONTAINING POLYESTER

BACKGROUND OF THE INVENTION

Oriented polyester film, particularly biaxially oriented film composed of polyethylene terephthalate (PET) is widely used as a packaging and label material for a variety of products, including foodstuffs.

Because the surface of oriented PET film is hydrophobic, it is not readily receptive to coating or printing. In many packaging and label applications it is advantageous that the film be receptive to ordinary flexographic and rotogravure printing inks.

In an attempt to remedy this deficiency, special inks have been devised that adhere directly to the surface of PET film. However, many such inks are based on formulations of organic solvents, resinous binders and other ingredients which are costly, difficult to handle and hazardous for use in the manufacturing plant.

Another approach for improving the printability of PET film is to apply a primer coating which adheres to the film and is receptive as well to printing inks applied thereto. Examples of such primer coatings include polymeric compositions based on vinylidene chloride terpolymers such as disclosed in U.S. Pat. No. 2,698,240 or water dispersible copolyester primers such as disclosed in U.S. Pat. No. 4,252,885. The problem with this approach to enhancing ink adhesion to PET film is that the film is in many instances used as a food packaging material and consequently the relative toxicity of the primer layer becomes important. Though polyester film per se is approved as a food packaging material by most Governmental agencies, including the U.S. Food and Drug Administration, polyester film primed with certain polymeric primer coatings such as acrylics, vinylidene chloride-containing polymers and many other similar primers raise toxicity problems because of potential migration of said primer material into foodstuff with which it is in contact. In addition, the poor reclaimability of these coated polyester films is a further problem.

It is known to coat polyester film with aqueous dispersions of polyesters or copolyesters containing free functional acid groups in order to produce light-sensitive photographic films, such as is disclosed in U.S. Pat. Nos. 4,252,885 and 4,304,851. In British Pat. No. 1,465,496 it is disclosed to coat polyester films with antistatic matte compositions comprising a polymer or copolymer in order to enchance receptivity to ink. It is also known to improve the printing performance of polyester films by treating the film with a stable polyester base layer and an overlayer of an acrylic or methacrylic polymer or copolymer in a volatile liquid, as is disclosed in British Pat. No. 1,572,345. British Pat. No. 1,371,855 discloses making a polyester film more receptive to printing inks by coating with a primer layer comprising an interpolymerized condensation resin derived from a monoaldehyde, 5 to 25 % by weight of the interpolymer of acrylamide or methacrylamide and at least one other unsaturated monomer, the condensation taking place in the presence of an alkanol containing from one to six carbon atoms. European Publication No. 0029620 teaches a PET priming layer which is based on an aqueous dispersion of the condensation product of ethylene glycol and a mixture of terephthalic acid, isophthalic acid and a salt of sulfoisophthalic acid, which primer is useful for improving the adherence of gelatin-based photosensitive coatings.

None of the prior art disclosures, however, are successfully addressed to the problem of the enhancement of the printability of polyester film and the solution of that problem by the technique hereinafter disclosed.

Accordingly, it is an object of this invention to provide an oriented, self-supporting polyester film material having enhanced receptivity to flexographic or rotogravure printing inks.

Another object is to provide a primer coating for oriented polyester film material which can safely and easily be applied in the plant during production of the film.

A further object is to provide a primer material for biaxially oriented polyethylene terephthalate film material which renders such film generally receptive to flexographic or rotogravure printing inks for packaging applications.

SUMMARY OF THE INVENTION

These and other objects of the invention may be achieved by the provision of a primer coated oriented polyester film wherein the primer coating is a polyester comprising a branched chain phosphorus-containing polymer which is the reaction product of at least one dicarboxylic reactant, at least one diol or polyoxyalkylene glycol and a phosphorus acid reactant.

The polyester priming layer may be applied to the polyester film before or during the stretching operations. The resultant primed polyester film is found to provide excellent adhesion to many aqueous or organic solvent based printing inks subsequently applied thereto.

DETAILED DESCRIPTION OF THE INVENTION

The preferred oriented polyester film base for the purposes of this invention is made from polyethylene terephthalate, although the invention is equally applicable to film based on a crystallizable polyester resulting from the polycondensation of a glycol such as ethylene glycol or butane diol and mixtures thereof with terephthalic acid or mixtures of terephthalic acid and other dicarboxylic acids such as isophthalic acid, diphenic acid and sebacic acid, or their polyester forming equivalents, which polyesters are made by methods well known in the art. The film may be produced by techniques also well known in the art using well known apparatus.

For example, the polyester is melted and extruded as an amorphous sheet onto a polished revolving casting drum to form a cast sheet of the polymer. Thereafter, the film is axially stretched in one direction, either in the direction of extrusion (longitudinal), or perpendicular to the direction of extrusion (transverse) in the case of monoaxially oriented film, and in two directions in the case of biaxially oriented film, that is, the film is stretched in both the longitudinal and transverse directions. The first stretching step of the cast sheet may be in either of these two orthogonal directions. The amount of stretching, to impart strength and toughness to the film, can range from about 3.0 to about 5.0 times the original cast sheet dimension in one or both directions. Preferably, the amount of stretching is in the range of between about 3.2 and 4.2 times the original dimension. The stretching operations are carried out at temperatures in the range of from about the second order transition temperature to below the temperature at which the polymer softens and melts.

Where desired, the film is heat treated, after stretching, for a period of time necessary to crystallize the polyester film. Crystallization imparts stability and good tensile properties to the film. When polyethylene terephthalate is heat treated, it is subjected to a temperature in the range of between about 190° C. and 240° C. and, more preferably, in the range of between about 215° C. and 235° C.

The phosphorus-containing polyester primer coating of this invention is preferably applied in-line at one of two stages during the film manufacture: the pre-draw stage at the point between the casting of the amorphous sheet and the first stretch such as disclosed, for example, in British Pat. No. 1,411,564 or the inter-draw stage subsequent to the uniaxial drawing but prior to the biaxial such as disclosed, for example, in U.S. Pat. No. 4,214,035. Normally, the heat applied to the film during the stretching or final conditioning stages is sufficient to dry the primer coating.

In one preferred embodiment, the primer coating is applied after the film is unaxially stretched, that is, after the film is stretched in the longitudinal direction, but before the film is stretched in the orthogonal direction. In this preferred embodiment after longitudinal stretching, the film is coated by any of the well known techniques employed in the art. For example, coating may be effected by roller coating, spray coating, slot coating or immersion coating. In a preferred embodiment, the polyester film is coated by means of gravure roller coating. Also, the uniaxially drawn film may be subjected to a corona discharge by a corona discharge apparatus prior to coating as is known in the art. The discharge treatment decreases the hydrophobic character of the polyester film surface, which permits the coating to more easily wet the surface and thus improve the adhesion of the coating to the surface.

As indicated above, effective ink adhesion promoting primer layers for PET film are polyesters comprising a branched chain phosphorus-containing polymer which is the reaction product of at least one dicarboxylic acid reactant, at least one diol or polyoxyalkylene glycol and a phosphorus acid reactant.

These phosphorus-containing polyesters are described in U.S. Pat. No. 4,098,741, issued to Login. They comprise the condensation product of:
(a) a dicarboxylic reactant consisting of isophthalic acid, the corresponding lower alkyl ester, acyl halide, and mixtures thereof or said dicarboxylic reactant in optional admixture with up to equal parts on a molar basis of (1) at least one aliphatic dicarboxylic acid of the formula $HOOC(CH_2)_nCOOH$, wherein n ranges from about 1-11, a corresponding acid anhydride, lower alkyl ester and acyl halide or mixtures thereof, (2) at least one other aromatic dicarboxylic acid, a corresponding acid anhydride, lower alkyl ester and acyl halide, or (3) mixtures of (1) and (2),
(b) at least one diol or polyoxyalkylene glycol having from about 2 to 11 carbons atoms, and
(c) a phosphorus acid reactant, wherein said polyester is solid, branched, contains repeating carbonyl-oxy units and phosphate units wherein each of said units is an integral part of said polyester chain and said polyester has a carboxylic acid number of about 5 to about 15 and a molecular weight of about 4,000 to about 11,000.

The polyester primer coating composition of the invention is prepared from an aromatic, aliphatic or cycloaliphatic dicarboxylic reactant such as dicarboxylic acids and esters, their corresponding acyl halides, or their corresponding anhydrides where they exist or mixtures thereof. Examples of useful acid anhydrides are: phthalic and maleic anhydrides. Examples of useful dicarboxylic acids are phthalic, terephthalic, isophthalic, oxalic, malonic, succinic, glutaric, 2,2-dimethyl-glutaric, adipic, pimelic, azelaic, sebacic, maleic, itaconic, fumaric, 1,3-cyclopentane dicarboxylic, 1,2-cyclohexane dicarboxylic, 1,3-cyclohexane dicarboxylic, 1,4-cyclohexane dicarboxylic, 2,5-norbornane dicarboxylic, 1,4-naphthalic, dipenic, 4,4-oxydibenzoic, 4,4'-sulfonyl dibenzoic, diglycolic, thiodipropionic, and 2,5-naphthalene dicarboxylic acids. Because of their known contribution to film strength in polyesters, the aromatic diacids such as isophthalic acid or terephthalic acid are preferred. Suitable mixtures of these dicarboxylic acids can be utilized to obtain desired modifications of physical properties in the polyester primer coating composition of the invention as is well known to those skilled in the art. The corresponding esters and acyl halides of the above enumerated dicarboxylic acids can also be used in preparing the novel polyester primer coating compositions of the invention. Examples of representative esters include dimethyl 1,4-cyclohexanedicarboxylate, dimethyl 2,6-naphthalenedicarboxylate, dibutyl 4,4'-sulfonyldibenzoate, dimethyl isophthalate, dimethyl terephthalate, and diphenyl terephthalate. Acyl halides are characterized by the general formula RCOX, wherein R is aliphatic, aromatic or cycloaliphatic and X is chlorine, bromine or fluorine. Examples of useful compounds are: terephthaloyl dichloride, isophthaloyl dichloride, malonyl dichloride, itaconyl dichloride. Copolyesters can be prepared from two or more of the above dicarboxylic reactants or derivatives thereof.

The diol or polyoxyalkylene glycol used in preparing the novel polyester primer coating compositions of the invention can be a poly(alkylene glycol) having the generalized formula:

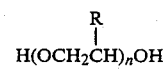

and wherein n is an integer of from 1 to about 10, or a poly(methylene glycol) having the generalized formula:

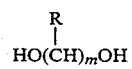

wherein m is an integer of from 3 to about 10 and R is hydrogen, methyl, ethyl, phenyl or glycidol ($-CH_2-O-R^1$) in which $R^1$ is phenyl, butenyl, or mixtures thereof.

Examples of useful polyoxyalkylene glycols are the polyethylene, polypropylene and polyethylene-polypropylene glycols which include diethylene, triethylene, tetraethylene, pentaethylene, hexaethylene, heptaethylene, octaethylene, nonaethylene, decaethylene, dipropylene glycols and mixtures thereof. Preferably, the poly(oxyalkylene glycol) is selected from the group consisting of diethylene glycol, triethylene glycol and mixtures thereof.

The diol component of the polyester of the invention can consist of aliphatic, cycloaliphatic and aromatic glycols. Examples of useful diols (glycols) include ethylene glycol; propylene glycol; 1,3-propanediol; neopentyl glycol; 2,4-dimethyl-2-ethylhexane-1,3-diol; 2,2-dimethyl-1,3-propanediol; 2-ethyl-2-isobutyl-1,3-propanediol; 1,3-butanediol; 1,5-pentanediol; 1,6-hexanediol; 1,2-cyclohexanedimethanol; 1,3-cyclohexanedimethanol; 1,4-cyclohexanedimethanol; 2,2,4,4-tetramethyl-1,3-cyclobutanediol; p-xylylenediol; catechol; resorcinol; and hydroquinone. Preferably, the poly(methylene glycol) is selected from the group consisting of ethylene glycol, propylene glycol and 1,4-butanediol. Copolymers can be prepared from two or more of the above glycols.

In U.S. Pat. No. 4,098,741, the polyesters are used as sizing compositions for sizing spun and continuous filament yarn produced from hydrophobic fibers. The ability of the phosphorus-containing polyesters to adhere to polyester sheeting is established in this patent, the complete disclosure of which is hereby incorporated herein by reference.

The phosphorus-containing polyesters to be used as a primer coating for PET in this invention generally contain, based upon the sum of the theoretical mole percentages of the other components of said polyester, about 5 to about 15 mole percent of the phosphorus acid reactant; about 45 to about 35 mole percent of at least one dicarboxylic reactant; with the remainder being 50 mole percent of at least one diol or polyoxyalkylene glycol. The preferred phosphorus acid reactants are phosphoric acid, phosphorus pentoxide or mixtures thereof. Most preferably, the primer coating of this invention consists essentially of a phosphorus-containing polyester consisting of the monomers set forth infra. The term "consists essentially of" as used hereinabove is not intended to exclude the presence of minor amounts of other ingredients as hereinafter set forth.

When preparing the phosphorus-containing polyester primer coatings for PET according to U.S. Pat. No. 4,098,741, a moderate molecular weight branched chain polyester is obtained which is a solid at ambient temperatures and contains repeating carbonyl-oxy units and phosphate units wherein said units are an integral part of the polymer chain. Such polyesters are generally prepared in the free acid form and are usable as such or easily converted to water-dispersible, moisture sensitive materials by neutralizing or partially neutralizing the free acid with a basic material such as an alkali metal carbonate, alkali metal hydroxide, ammonia or an amine.

The compositions are prepared so as to obtain a carboxylic acid number preferably about 5 to about 15 and most preferably about 8 to about 12. Using the formula provided in Column 5, lines 3 to 11 of U.S. Pat. No. 4,098,741, an acid number range of about 5 to about 15 corresponds to a molecular weight range of about 4,000 to about 11,000.

As indicated above, the primer coating of the present invention is applied to the base polyester film as an aqueous dispersion and at solids concentration within the range of about 0.5 to about 15%, preferably about 2 to about 10%. The preferred coating weight range is from 0.0098 g/m$^2$ to 0.059 g/m$^2$ and, more preferably, 0.023 g/m$^2$ to 0.031 g/m$^2$, with the target being 0.026 g/m$^2$. It should be noted that the upper limits on the range of coating weight are not critical. The only drawback to heavier coating weights is the excessive cost of the coating.

The coating may be applied to one or both sides of the film, or it may be applied to one side and a different coating such as a thermosetting acrylic or methacrylic coating applied to the opposite side, such as taught in U.S. Pat. No. 4,214,035. In some cases, it may be desirable to include a hardening agent in the copolyester coating formulation, e.g., from about 1-20% by weight of a melamine or urea/formaldehyde condensation product, to further modify the properties of the primer coating. Other ingredients known in the art may also be present in the coating formulation such as anti-static agents, wetting agents, surfactants, pH regulating agents, anti-oxidants, dyes, pigments, slip agents such as colloidal silica, and the like.

The primer coatings of the invention exhibit excellent heat stability and accordingly any scrap primed film made during production can be mixed with fresh polyester, re-melted, and re-fed to the film-forming extruder to produce oriented film. Such film produced containing significant quantities of primed scrap reclaim exhibits good quality, color and appearance with very little perceptible degradation of properties due to the presence of the coating impurity. Thus the primed film of this invention offers commercial advantage to the film manufacturer over many other primed films, such as films primed with vinylidene chloride-containing polymers as disclosed in U.S. Pat. Nos. 2,627,088 and 2,698,240, which tend to degrade and discolor when reclaimed.

A major application of the primed film of this invention is as a packaging or label material. The primed films demonstrate improved adhesion to aqueous and organic solvent based flexographic and rotogravure printing inks when compared with unprimed film. These inks may comprise aqueous/alcohol or organic solvent dispersions or solutions of dyes optionally in combination with soluble resins and thickening agents. Furthermore, when the coated film is printed with laminating inks it can be extrusion coated or adhesively laminated. The resultant laminate exhibits excellent bond strength in both the ink and non-ink areas.

The following examples are illustrative of the invention but it is understood that the invention is not limited thereto.

Each of the primed films of the following examples were evaluated for ink adhesion by applying the inks to cut pieces of the film samples by drawdown technique using a wire-wound bar, a No. 6 Meyer rod, followed by oven drying of the ink at 140° F. for at least one minute. A strip of adhesive tape (Scotch brand No. 610) was adhered to the dried inked surface, rubbed to insure intimate contact, and then rapidly pulled away from the film. The amount of ink remaining in the area which was under the tape was then expressed as a percentage of the area, i.e., no ink removed equals 100% adhesion, all ink removed equals 0% adhesion, with intermediate adhesion values being assessed in terms of the proportion of ink remaining adhered to the film.

EXAMPLE I

The ammonium salt of a water based polyester comprising Diethylene Glycol, Phosphoric Acid and Isophthalic Acid was prepared by the method disclosed in U.S. Pat. No. 4,098,741. This polyester was coated on 48 gauge, type 2000 film at the inter-draw stage, that is, subsequent to the longitudinal stretching and prior to the transverse stretching stages, at a 3.8% solids level. The actual weight of the polyester was calculated at 0.026 grams of dry polymer solids/m². The adhesion of two water based inks and four solvent based inks to the prepared coated film samples is shown in Table 1. The inks used were all commercially available and the % Ink Adhesion was calculated by hand drawdowns with a No. 6 Meyer rod and a No. 610 Scotch tape test, as described hereinabove. The inks were obtained from, respectively, Inmont Corporation of Charlotte, N.C.; Custom Printing Inks, Ltd. (CPI) of San Diego, Calif.; General Printing Inks Division of Sun Chemical Corporation (GPI) of Northlake, Ill.; and Consolidated Printing Inks Division of Sinclair and Valentine (S&V) of West St. Paul, Minn.

TABLE 1

| | | % INK ADHESION | | | | | |
|---|---|---|---|---|---|---|---|
| Film Samples | (% Solids) | Inmont CR 28722 Aquabond "S" White | CPI R-1094 Water Red | GPI P 80-4589 Sunester White | Inmont 79 CR 541 Wonderflex Process Blue | S & V DR 2660 Sinva Prop Red | S & V ATC 58766 Sinva Prop White |
| Uncoated | | 85 | 10 | 50 | 65 | 95 | 90 |
| Coated Sample | 3.8% | 95 | 5 | 100 | 95 | 100 | 80 |

EXAMPLE II

Because there are so many different flexographic and rotogravure ink formulations used in the package converting industry, it became necessary to pick several inks that could be used as standards. Four different ink vehicles were prepared to represent the type of inks used in flexible film packaging. A small amount of Rhodamine B dye (1% Rhodamine B dye in n-butanol) was added to the ink vehicles to render them various shades of pink in order to aid in observation when testing for adhesion. The Polyamide ink vehicle was an alcohol-based vehicle including therein Unirez 2215 obtained from the Union Camp Corporation of Wayne, N.J. The second vehicle was prepared with ¼" RS nitrocellulose and the third vehicle was prepared with ¼" SS nitrocellulose. The fourth vehicle was an acrylic water flexo utilizing Joncryl 67 from S. C. Johnson & Son, Inc. of Racine, Wis. All four inks were coated on film samples prepared as in Example I (i.e., in accordance with U.S. Pat. No. 4,098,741) using hand drawdowns with a No. 6 Meyer rod, dried, then tested for adhesion with No. 610 Scotch tape. The results are reported in Table 2.

TABLE 2

| | % INK VEHICLE (Rhodamine B added) ADHESION | | | |
|---|---|---|---|---|
| Film Sample | Polyamide | ¼" RS Nitro | ¼" SS Nitro | Water Flexo |
| Uncoated | 100 | 0 | 0 | 0 |
| Coated Sample | 100 | 100 | 100 | 99 |

EXAMPLE III

The primer coated film of this invention was prepared as in Example I (i.e., in accordance with U.S. Pat. No. 4,098,741) and was tested at various % solids levels which correspond to different thickness levels. The inks tested were prepared from vehicles identical to those of Example II. The text procedure was identical to that of Examples I and II and the results are listed in Table 3.

TABLE 3

| | % INK ADHESION | | | |
|---|---|---|---|---|
| Film Sample (% Solids) | ¼" RS Nitro | ¼" SS Nitro | Polyamide | Water Flexo |
| Uncoated | 5 | 30 | 20 | 5 |
| Coated Sample (.05%) | 15 | 45 | 15 | 10 |
| Coated Sample (.1%) | 15 | 60 | 20 | 10 |
| Coated Sample (.2%) | 20 | 50 | 50 | 5 |
| Coated Sample (.5%) | 10 | 50 | 100 | 0 |
| Coated Sample (1.0%) | 75 | 65 | 100 | 95 |
| Coated Sample (2.0%) | 10 | 25 | 100 | 95 |
| Coated Sample (4.0%) | 50 | 75 | 100 | 50 |

EXAMPLE IV

The primer coating of this invention was prepared as in Example I (i.e., in accordance with U.S. Pat. No. 4,098,741), with the inclusion of a minor amount of colloidal silica as a slip agent. This polyester was coated on 48 gauge, type 2000 PET film at the interdraw stage. The bond strength of the primed film when laminated with polyethylene using various adhesives was tested by cutting one-inch wide strips and then performing a double 90° peel test in an Instron. In a double 90° peel test the polyester and polyethylene films are manually delaminated at one end of the strip. The ends are placed in the jaws of the Instron and the resistance to separation is measured in grams/inch width. The tail of the laminate is held at 90° while pulling the layers apart at a crosshead speed of 12 inches/minute.

The samples used in this example were non-printed. The adhesives used were Ixan, obtained from Solvay Cie S.A. of Bruxelles, Belgium; Lamal HSA, obtained from Polymer Industries of Greenville, S.C.; and an adhesive formulated by Henkel U.K. of West Germany. The results are shown in Table 4.

TABLE 4

| Adhesive Used | Bond Strength (g/inch width) |
|---|---|
| Ixan | 232 |
| Lamal HSA | 422 |
| Henkel | tear[1] |

[1] sample tore when delamination attempted

EXAMPLE V

Primer coated PET was prepared as in Example IV. The resultant film was then printed on with either nitrocellulose (nit.) or acrylic modified nitrocellulose (acr.) inks by either flexography (flexo.) or rotogravure (grav.). Some of the samples were extrusion coated with polyethylene using Adcote 333, obtained from Morton Chemical of Chicago, Ill., and some of the samples were adhesively laminated to polyethylene using either Lamal HSA or the adhesive obtained from Henkel. The samples were then tested for bond strength and the results are shown in Table 5.

TABLE 5

| Method of Printing | Ink | Adhesive | Bond Strength (g/inch) |
|---|---|---|---|
| flexo | nit. | Adcote | tear[1] |
| flexo | nit. | Lamal HSA | no start[2] |
| flexo | nit. | Henkel | no start |
| flexo | acr. | Adcote | 341 |
| flexo | acr. | Lamal HSA | tear |
| flexo | acr. | Henkel | tear |
| grav. | nit. | Lamal HSA | no start |

[1] sample tore when delamination attempted
[2] sample bonded so well that delamination could not be started As can be seen from the tables above, film primed with phosphorus-containing polyesters as disclosed herein exhibited greatly enhanced adhesion with respect to inks than did uncoated PET film. In addition, film primed with phosphorus-containing polyesters as disclosed herein exhibited excellent bond strength.

I claim:

1. An oriented self-supporting polyester film having a thin continuous primer coating having a thickness within the range of about 0.0098 to 0.059 grams per square meter on one or both sides thereof, said coating comprising a second polyester comprising the condensation product of:
    (a) a dicarboxylic reactant consisting of isophthalic acid, the corresponding ester, acyl halide, and mixtures thereof or said dicarboxylic reactant in optional admixture with up to equal parts on a molar basis of (1) at least one aliphatic dicarboxylic acid, a corresponding acid anhydride, ester and acyl halide or mixtures thereof, (2) at least one other aromatic dicarboxylic acid, a corresponding acid anhydride, ester and acyl halide, or (3) mixtures of (1) and (2),
    (b) at least one diol or polyoxyalkylene glycol, and
    (c) a phosphorus acid reactant, wherein said second polyester is solid, branched, and contains repeating carbonyl-oxy units and phosphate units wherein each of said units is an integral part of said polyester primer coating chain.

2. The film of claim 1 wherein said oriented polyester film is biaxially oriented polyethylene terephthalate film.

3. The film of claim 1 wherein said film is prepared by melt extruding a substantially amorphous polyester film and thereafter orienting the film by stretching in one or two directions and heatsetting the film, said primer coating being applied to said film as an aqueous dispersion prior to stretching in one direction, or subsequent to stretching in one direction but prior to stretching in a mutually perpendicular direction.

4. The film of claim 1 wherein said polyester primer coating has a carboxylic acid number of about 5 to 15 and a molecular weight of about 4,000 to about 11,000.

5. The film of claim 4 wherein said dicarboxylic reactant is present in the proportion of about 45 to about 35 mole percent; said diol or polyoxyalkylene glycol is present in the proportion of 50 mole percent; and said phosphorus acid reactant is present in the proportion of about 5 to about 15 mole percent.

6. The film of claim 5 wherein said phosphorus acid reactant is selected from the group consisting of phosphoric acid, phosphorus pentoxide and mixtures thereof.

7. The film of claim 5 wherein said primer coating is applied subsequent to stretching in one direction but prior to stretching in a mutually perpendicular direction.

8. The film of claim 7 wherein said oriented polyester film is biaxially oriented polyethylene terephthalate film.

9. An oriented self-supporting polyester film having a thin continuous primer coating having a thickness of about 0.0098 to 0.059 grams per square meter, on one or both sides thereof, said coating comprising a second polyester consisting essentially of the condensation product of:
    (a) a dicarboxylic reactant consisting of isophthalic acid, the corresponding ester, acyl halide, and mixtures thereof or said dicarboxylic reactant in optional admixture with up to equal parts on a molar basis of (1) at least one aliphatic dicarboxylic acid, a corresponding acid anhydride, ester and acyl halide or mixtures thereof, (2) at least one other aromatic dicarboxylic acid, a corresponding acid anhydride, ester and acyl halide, or (3) mixtures of (1) and (2),
    (b) at least one diol or polyoxyalkylene glycol, and
    (c) a phosphorus acid reactant, wherein said second polyester is solid, branched, contains repeating carbonyl-oxy units and phosphate units wherein each of said units is an integral part of said second polyester chain and said second polyester has a carboxylic acid number of about 5 to about 15, a molecular weight of about 4,000 to about 11,000, and wherein said dicarboxylic reactant is present in the proportion of about 45 to about 35 mole percent; said diol or polyoxyalkylene glycol is present in the proportion of 50 mole percent; and said phosphorus acid reactant is present in the proportion of about 5 to 15 mole percent.

10. The film of claim 9 wherein the dicarboxylic reactant of the primer coating is isophthalic acid.

11. The film of claim 9 wherein the diol or polyoxyalkylene glycol of the primer coating is diethylene glycol.

12. The film of claim 9 wherein the phosphorus acid reactant of the primer coating is phosphoric acid.

13. The film of claim 9 wherein the dicarboxylic reactant of the primer coating is isophthalic acid, the diol or polyoxyalkylene glycol of the primer coating is diethylene glycol and the phosphorus acid reactant of the primer coating is phosphoric acid.

14. The film of claim 3 wherein said film is subjected to a corona discharge treatment prior to the application of said primer coating.

15. The film of claim 2 having a printing ink composition applied directly to said primer coating.

16. The film of claim 3 having a printing ink composition applied directly to said primer coating.

17. The film of claim 9 having a printing ink composition applied directly to said primer coating.

18. The film of claim 10 having a printing ink composition applied directly to said primer coating.

19. The film of claim 11 having a printing ink composition applied directly to said primer coating.

20. The film of claim 12 having a printing ink composition applied directly to said primer coating.

21. The film of claim 13 having a printing ink composition applied directly to said primer coating.

22. The film of claim 9 wherein said primer coated polyester film is laminated to a second film.

* * * * *